United States Patent
Birk et al.

(10) Patent No.: US 7,526,799 B2
(45) Date of Patent: Apr. 28, 2009

(54) METHOD FOR TRACKING SECURITY ATTRIBUTES ALONG INVOCATION CHAIN USING SECURE PROPAGATION TOKEN

(75) Inventors: Peter Daniel Birk, Austin, TX (US); Keys Dylan Botzum, Columbia, MD (US); Ching Yun Chao, Austin, TX (US); Hyen-Vui Chung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 10/882,052

(22) Filed: Jun. 30, 2004

(65) Prior Publication Data

US 2006/0021016 A1 Jan. 26, 2006

(51) Int. Cl.
*H04L 9/32* (2006.01)
*G06F 17/30* (2006.01)
(52) U.S. Cl. .......................... 726/9; 713/156
(58) Field of Classification Search ................ 713/157; 726/9
See application file for complete search history.

(56) References Cited

U.S. PATENT DOCUMENTS 5,765,153 A * 6/1998 Benantar et al. ............... 707/9
7,137,006 B1 * 11/2006 Grandcolas et al. ........ 713/180
7,234,370 B2 * 6/2007 Kim ............................. 74/513
7,353,535 B2 * 4/2008 Kaler et al. .................... 726/5
2005/0044398 A1 * 2/2005 Ballinger et al. ........... 713/200
2005/0273844 A1 * 12/2005 Dapkus et al. ................ 726/9
2006/0095779 A9 * 5/2006 Bhat et al. ................... 713/182

OTHER PUBLICATIONS

Curbera et al., "Unraveling the Web Services Web", Mar. 2002, IEEE Internet Computing, pp. 86-93.*

* cited by examiner

*Primary Examiner*—Kambiz Zand
*Assistant Examiner*—William S Powers
(74) *Attorney, Agent, or Firm*—Yee & Associates, P.C.; Matthew B. Talpis

(57) ABSTRACT

A method for tracking security attributes along invocation chain using secure propagation token. When a user is authenticated, a propagation token is created. The propagation token includes a caller list, a host list, and custom attributes. The propagation token may be propagated downstream along with other marker tokens. A service provider may associate custom attributes in the propagation token or create custom propagation token to be propagated. The propagation token tracks the original caller and subsequent callers when user switches occur and a list of hosts at which the propagation token lands on.

22 Claims, 11 Drawing Sheets

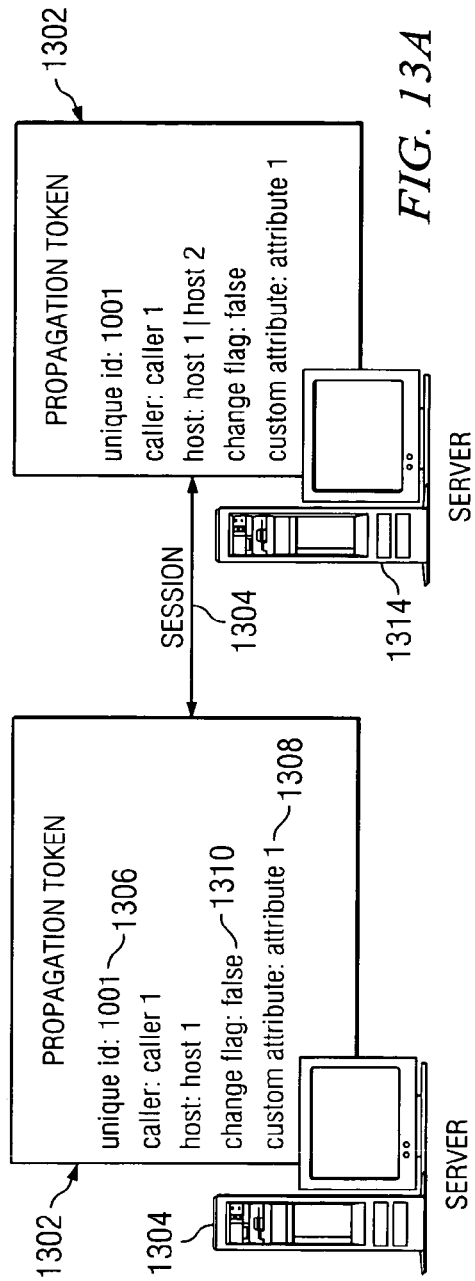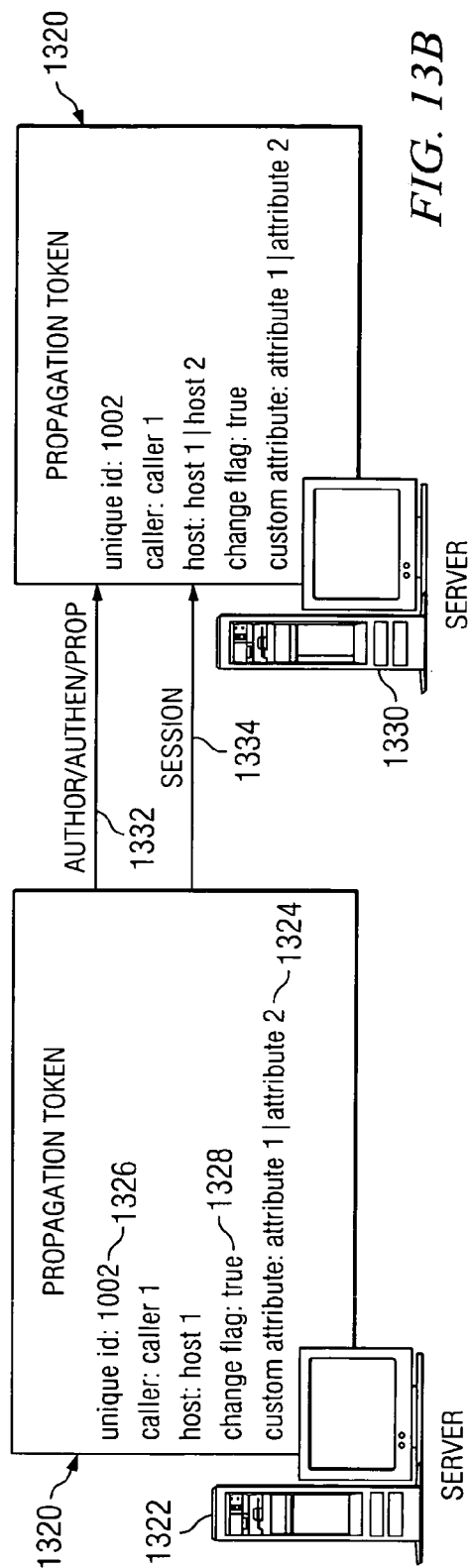

METHOD FOR TRACKING SECURITY ATTRIBUTES ALONG INVOCATION CHAIN USING SECURE PROPAGATION TOKEN

CROSS REFERENCE TO RELATED APPLICATIONS

The present invention is related to the following applications entitled "METHOD AND APPARATUS FOR IDENTIFYING PURPOSE AND BEHAVIOR OF RUN TIME SECURITY OBJECTS USING AN EXTENSIBLE TOKEN FRAMEWORK", Ser. No. 10/882,053, filed on Jun. 30, 2004; "METHOD AND APPARATUS FOR HANDLING CUSTOM TOKEN PROPAGATION WITHOUT JAVA SERIALIZATION", Ser. No. 10/882,118, filed on Jun. 30, 2004. Both related applications are assigned to the same assignee and are incorporated herein by reference.

BACKGROUND OF THE INVENTION

1. Technical Field

The present invention relates to an improved network data processing system. Particularly, the present invention relates to security attribute propagation in a network data processing system. Still more particularly, the present invention relates to using a secure propagation token for tracking security attributes along an invocation chain of a network data processing system.

2. Description of Related Art

As the popularity of the Internet has increased in recent years, more and more consumers and service providers perform transactions over the World Wide Web. These transactions include secured transactions, which require authentication and authorization of a user or a service requester. An example of a secured transaction is a banking transaction, which requests a user to enter a login name and password prior to giving access to the user's bank account information. This type of transaction prevents perpetrators from gaining access to protected information.

However, service providers discover that single point of authentication is more suitable to secured transactions that require many disparate systems, including, for example, the WebSphere Application Server, a product available from International Business Machines Corporation. The single point of authentication is facilitated by using reverse proxy servers (RPS). A RPS is a proxy server placed in front of the firewall that mirrors an actual Web server behind the firewall, such that malicious attacks on the actual Web server are prevented by denying invalid incoming requests.

Within the reverse proxy servers, security attributes from users or service requesters' original logins are retained. These attributes include, for example, static attributes from the enterprise user registry and dynamic attributes from custom login logic based upon location, time of day, and authentication strength. By having access to these attributes, application servers, such as, for example, the WebSphere Application Server, may perform necessary authentication and authorization operations. In addition, backend systems may use these attributes to determine identity of the original requester and make access decisions and audit records accordingly. The backend systems include Customer Information Control System (CICS) and DB2 Universal Database, which are products available from International Business Machines Corporation.

In existing security infrastructures, attempts are made to propagate these security attributes beyond the server which performs the login. Such attempts include a trust association interceptor (TAI) interface that acts as a security gateway to the WebSphere Application Server for incoming requests that are received through the reverse proxy server. However, the TAI interface is designed to only accept a user name of the authenticated user and ignore all other security attributes that are collected from the original login at the reverse proxy server. Other security attributes may include custom tokens that carry authorization attributes useful to other systems downstream.

As a result, a "re-login" to the configured user registry is required by the application server to re-gather many of the security attributes. Unfortunately, the "re-login" attributes gathered may not include attributes that are originally collected at the reverse proxy server, which are useful to a third-party authorization engine or other custom applications. These attributes include original authentication strength, client location and IP address, among other custom attributes gathered during a login.

Therefore, a need exists for an improved network data processing system that propagates security attributes generated at the front-end reverse proxy server to systems downstream, such that more fine-grained authorization decisions may be made based on the first caller or service requester identified by the propagated attributes. In addition, a need exists for improved performance throughput in a data processing system that does not require a new login to the remote user registry each time the application server requests security information.

SUMMARY OF THE INVENTION

The present invention provides a method, for tracking security attributes along an invocation chain using secure propagation tokens. In a preferred embodiment, when a request is sent from a first server to a second server for authentication, the mechanism of the present invention enables the use of a default or custom login module to create a propagation token on the thread of execution. The default or customer login module may also associate security attributes to the propagation token for propagation downstream. The propagation token includes a caller list, a host list and other custom attributes. The caller list of the propagation token includes the originating caller and subsequent callers when context switches occur along the invocation chain. The host list includes each host the propagation token lands on. When a caller, a host or an attribute is added to the propagation token, it may not be removed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13A is a diagram illustrating an exemplary implementation of propagation token with same propagation attributes implemented using an established session between two servers in accordance with a preferred with a preferred embodiment of the present invention; and FIG. 13B is a diagram illustrating an exemplary implementation of propagation token with different propagation attributes implemented using a new session between two servers in accordance with a preferred embodiment of the present invention.

DETAILED DESCRIPTION OF THE PREFERRED EMBODIMENT

Figure 1:
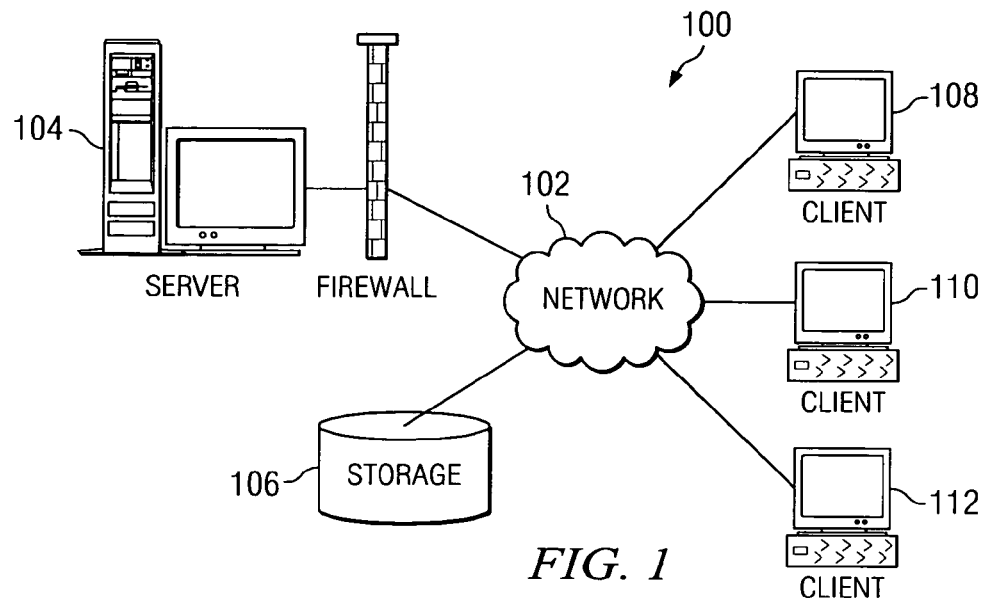
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. Also in the depicted example, server 114 is connected to server 104. Server 104 may serve authentication purpose for server 114. When a user logs in to server 104, the user id/password may be passed from server 104 to server 114. Firewall 122 acts as a gateway for servers 104, 114 and storage 106 to network 102 and firewall 124 acts as gateway for clients 108, 110 and 112. Firewalls 122 and 124 prevent unauthorized users from accessing server 104, storage 106, and clients 108-112.

In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
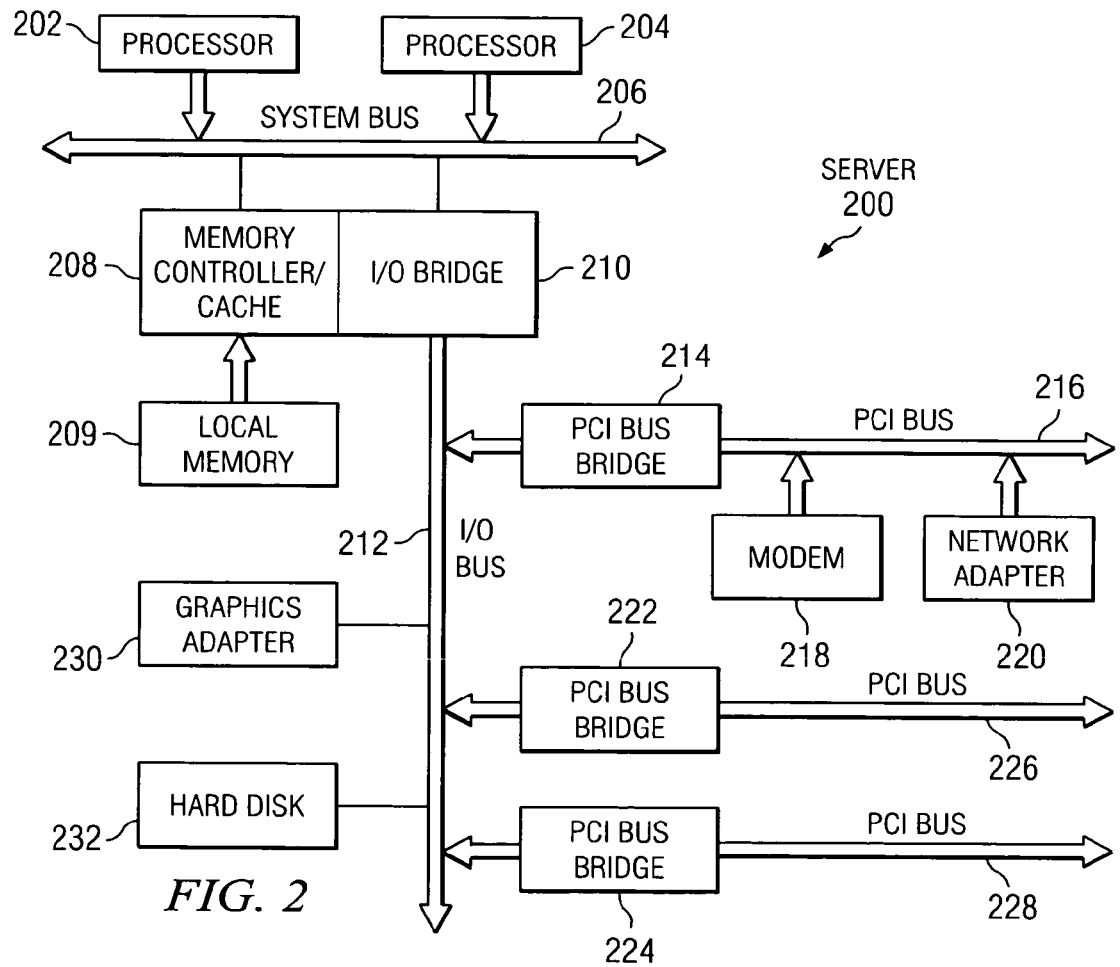
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

Figure 3:
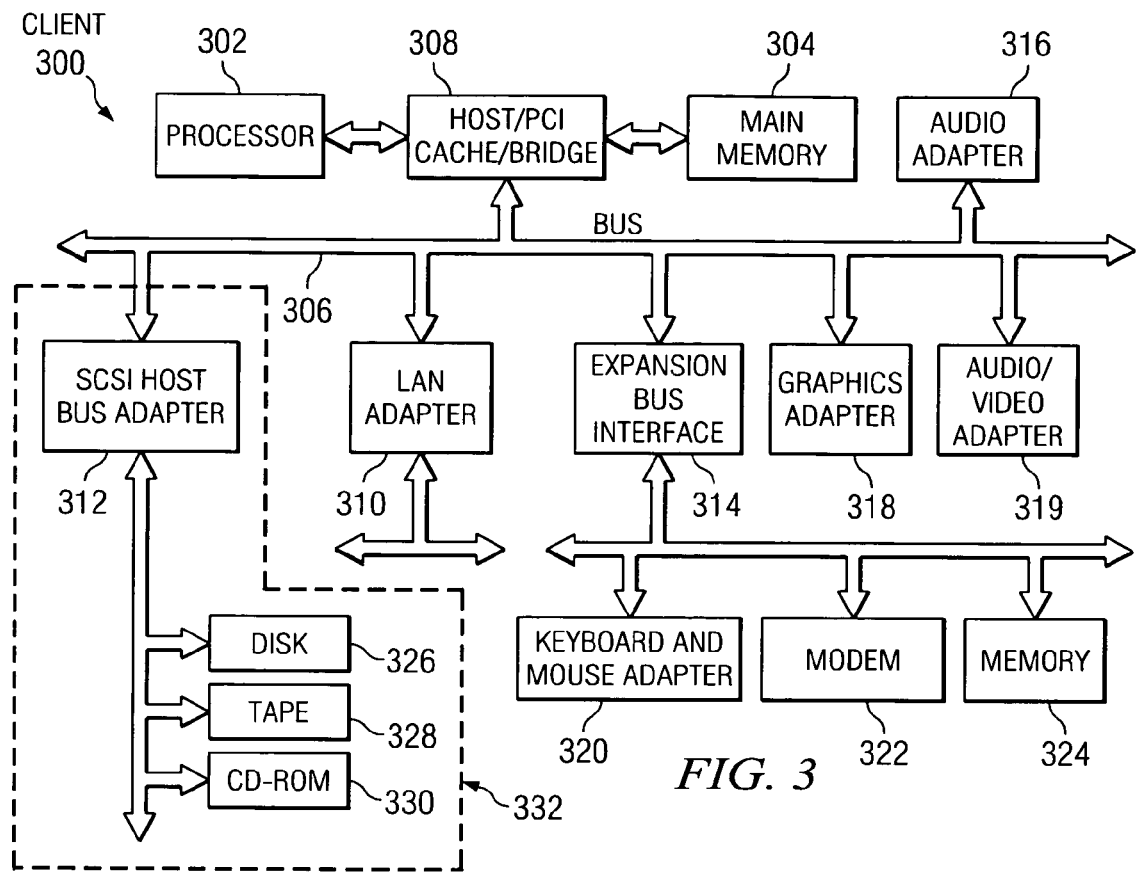
FIG. 3 is a block diagram of a data processing system in which the present invention may be implemented.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention provides a secure token object, in the form of a propagation token, which may be associated with a request and propagated along an invocation chain. A token is an object defined by the present invention to encapsulate information, which may or may not be security related. A propagation token is a token that is used to propagate the encapsulated information from one resource to another. An invocation chain represents a series of downstream calls. For example, resource A, a serlvet, calls resource B, a session enterprise Java bean, which in turn calls resource C, an entity enterprise Java bean. A resource may or may not reside on the same data processing system.

The propagation token maintains a caller list, a host list and custom attributes. The caller list identifies all user switches that take place on the thread of execution during the invocation chain. A thread of execution is a process that is currently executing in a data processing system, such as data processing system 300 in FIG. 3.

The host list identifies all hosts at which the request lands on during the invocation chain. Custom attributes may be security information that is useful to other applications downstream, such as, for example, strength of authentication or location of authentication.

In a preferred embodiment, when a request is invoked by a first server to a second server for authentication login, a propagation token is created at the first server and associated with the thread of execution at run time. The caller list of the propagation token is appended with a first caller and the host list is appended with a first host identifying the first server. Custom objects may also be added to the propagation token to include other security information.

Next, the propagation token is added by a first login module into an array list of token holders. A token holder is an object that represents a single token. This object may also represent a custom object or a hash table. The token holder is added to an array list and further serialized into an opaque token, which is a carrier of information from one resource to another. The serialized opaque token is then sent using a communication protocol, such as, for example, remote method invocation (RMI), to the second server for authentication.

Once the opaque token arrives at the second server, a second login module at the second server deserializes the opaque token into an array list of token holders. The second login module identifies each propagation token from the array list of token holders desired at the second server based on a name and a version field of the token holder and converts the byte field of the token holder back into a propagation token.

Once the propagation token is obtained, the second login module makes access control decisions based on security attributes in the propagation token. Examples of access control decisions include whether the originating caller may access a resource on the second server and whether the originating caller may access a backend database table.

Once authentication at the second server is complete, the second server may add other security attributes that are useful to other servers or applications into the propagation token to be propagated downstream. The second server may also create and add one or more custom propagation tokens to the thread of execution, such that one or more policies may be implemented to determine whether a server or resource downstream has access to the propagation token. A custom login module is required at the server or resource downstream in order to handle these custom propagation tokens.

In addition, the custom propagation token of the present invention enables session uniqueness. Typically, after a secured session is established between a server and a client or between two servers, subsequent requests are made via the same established session. However, if the attributes of the propagation token is changed after the session is established, a change flag of the propagation token is set to true and the unique id field of the propagation is updated to a different value. This value is used for session lookup when sending the request outbound. Consequent to the change of this value, a new session is established. The authorization information along with the propagation token is propagated downstream via the new session and a re-authentication is forced at the target server. Thus, each session is unique because the unique id value of the propagation token changes when attributes are added to the propagation token.

Finally, prior to initiating the request outbound, the host list of the propagation token is appended by the second login module with a second host identifying the second server. If a context switch occurs, meaning when the user within a subject is changed on the thread of execution, the caller list of the propagation token is appended with a second user. However, once the caller, the host or the custom attribute is added to the propagation token, it may not be removed. This is to protect against data being overridden in the propagation token for the thread of execution.

In an alternative embodiment, the propagation token of the present invention may be used for auditing and billing purposes. An audit programming interface may be provided to allow an originating caller to add an audit unique id to the propagation token. Subsequent audit records may be associated with the same audit unique id along the invocation chain. In this way, the propagation token enables linkage of audit records. In addition, since the caller list of the propagation token tracks the originating caller, the propagation token may be used for billing of time for access to resources, such as, for example, a DB2 Universal Database, or invocation of methods, on behave of the originating caller.

In yet another alternative embodiment, the propagation token may be used to accept or reject a request based on the host list accumulated. At any given server or resource along the invocation chain, a custom login module may accept or reject a request from a server or resource upstream by examining the sequence of hosts in the host list. If the sequence from the host list does not correspond to a desired sequence, the given server or resource may reject the request entirely. For example, if a service provider at the second server desires to follow a sequence of flow, which involves host a, b, c and d, the service provider may examine the host list of the propagation token to determine whether the propagation token has landed on host a, b, c prior to landing on host d. The service provider may accept or reject the request if the propagation token does not follow the desired sequence.

Figure 4A:
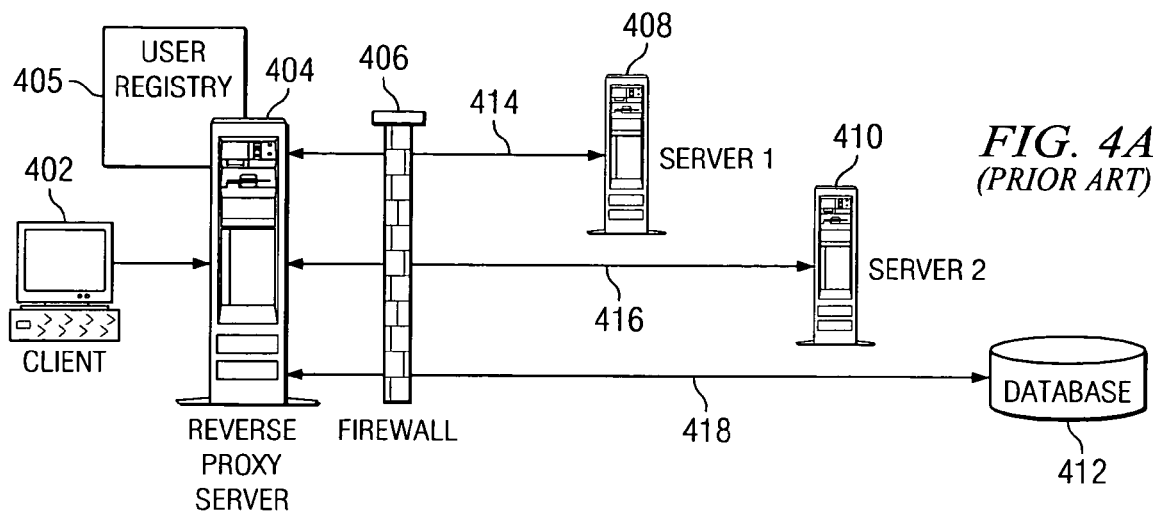
FIG. 4A is a diagram illustrating known interactions between reverse proxy server and servers downstream.

With reference to FIG. 4A, a diagram illustrating known interactions between reverse proxy server and servers downstream is depicted. As depicted in FIG. 4A, client 402 may be implemented as a data processing system, such as data processing system 300 in FIG. 3. Reverse proxy server 404, server 1 408, server 2 410, and database 412 may be implemented as a data processing system, such as data processing system 200 in FIG. 2.

When an application running on client 402 sends a request for authentication login, such as a single sign-on request, to reverse proxy server 404, reverse proxy server 404 maintains static login attributes in user registry 405. Examples of static login attributes include user id, password, groups the use is a member of, and the full username, for example, John R. Smith. Typically, reverse proxy server 404 is placed in front of firewall 406 and acts as a single entry point of authentication for login to server 1 408, server 2 410 and database 412.

Currently, when the original authentication login is performed at reverse proxy server 404, only a username is passed along to server 1 408. This username is converted to a secure authentication token which is then the only information passed to server 2 410. Thus, no dynamic attributes may be propagated downstream. Only static login attributes are presented to server 2 410 and database 412 at the time of access. Other original login information including attributes in user registry 405 and dynamic attributes, such as, for example, time of day, location and authentication strength, are not propagated to either server 1 408, server 2 410 or database 412. Therefore, server 1 408 is forced to "re-login" to reverse proxy server 404 through request 414 in order to gather information from user registry 405. Since the original login information at server 1 408 is not propagated, server 2 410 and database 412 are also forced to "re-login" to user registry 405 through requests 416 and 418 in order to further gather necessary original login information.

The requirements of "re-login" affects performance throughput, since a remote user registry call is made to user registry 405 at each hop, which significantly increases network traffic. Particularly, in a high traffic flow system, remote registry calls become very expensive and inefficient. In addition, since the user registry is accessible by many different processes, it often becomes a bottleneck when multiple processes compete for a registry lookup.

Figure 4B:
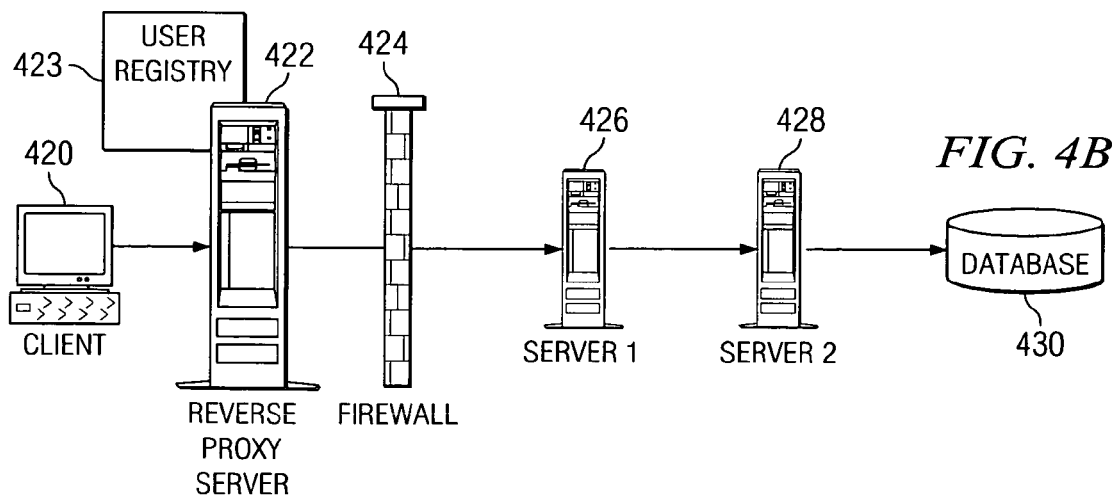
FIG. 4B is a diagram illustrating interactions between reverse proxy server and servers downstream in accordance with a preferred embodiment of the present invention.

Turning now to FIG. 4B, a diagram illustrating interactions between reverse proxy server and servers downstream is depicted in accordance with a preferred embodiment of the present invention. As illustrated in FIG. 4B, when client 420 sends a request to reverse proxy server 422 for authentication login, reverse proxy server 422 propagates original login information, which includes static attributes from user registry 423 and dynamic attributes, to server 1 426 through firewall 424. Using the mechanism of the present invention, server 1 426 is capable of propagating original login information to server 2 428, which in turn propagates the information to database 430. Thus, "re-login" requests are no longer necessary with the mechanism of the present invention since original login information is propagated downstream and performance throughput is greatly improved due to reduced network traffic.

Figure 5:
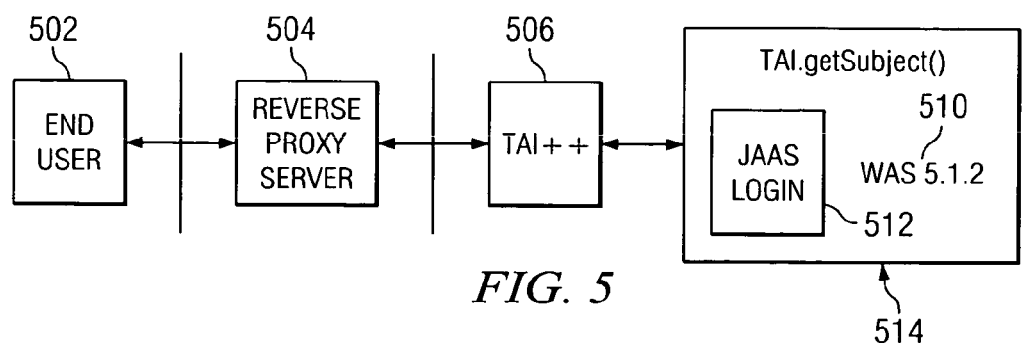
FIG. 5 is a diagram illustrating interaction between components of the present invention in accordance with a preferred embodiment of the present invention.

Turning next to FIG. 5, a diagram illustrating interaction between components of the present invention is depicted in accordance with a preferred embodiment of the present invention. As shown in FIG. 5, in this example implementation, end user 502 sends an authentication request to reverse proxy server 504. Reverse proxy server 504 then forwards the end user's identity to trust association interceptor (TAI) 506, which acts as a security gateway between end user 502 and application server 510. The user identity may include a user id and password. The TAI interface in turn passes the user's identity to application server 510, such as a WebSphere Application Server.

In the prior art, with only user's identity, application server 510 has to re-login to reverse proxy server 504 to gather original login information. With the present invention, a default JAAS login module 512 or custom login module may be plugged in JAAS login configuration implemented by application server 510 to map original login information from reverse proxy server 504 to a credential and principal of a Subject stored at run time. The Subject is created using TAI.getSubject method 514 in these illustrative examples. Thus, using a default or custom login module of the present invention, authorization and authentication information may now be propagated downstream to other servers.

Figure 6:
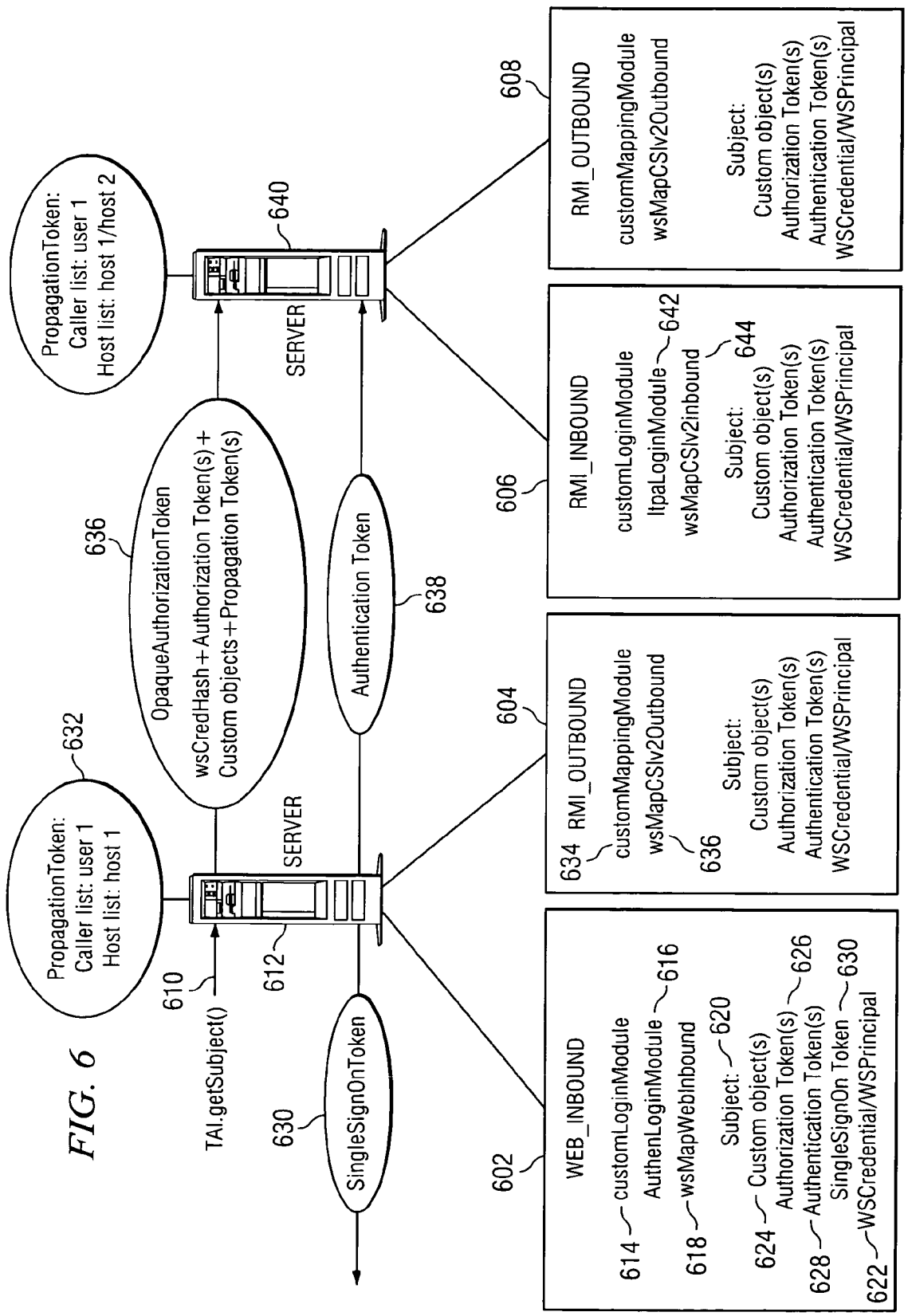
FIG. 6 is a diagram illustrating mechanism of the present invention used for security attribute propagation in accordance with a preferred embodiment of the present invention.

Turning now to FIG. 6, a diagram illustrating an exemplary mechanism of the present invention used for security attribute propagation is depicted in accordance with a preferred embodiment of the present invention. As depicted in FIG. 6, the mechanism of the present invention extends the Java™ Authentication and Authorization Service (JAAS) framework, a product available from Sun Microsystems, Inc. The JAAS framework allows pluggable login modules to be used for performing authentication regardless of underlying authentication technology.

The present invention provides default login configurations, which include Web inbound login configuration 602, inbound login configuration 604 and outbound login configuration 606. Each login configuration includes a number of login modules that are called in sequence for an authentication login.

In this example implementation, Web inbound login configuration 602 is used for Web resource login and handling of hypertext transfer protocol (HTTP) requests and responses. Web inbound login configuration 602 includes custom login module 614, authentication login module 616 and map Web inbound login module 618.

When a TAI.getSubject call 610 is invoked at server 612, Web inbound login configuration 602 receives a user identity from the trust association interceptor (TAI), which is an interface used by an application server, such as a WebSphere Application Server, to gather user information. The user identity passed in may include authorization attributes gathered at the reverse proxy server along with authentication data or only authentication data. The authentication data may include a token or user id/password. If the user identity passed into Web inbound login configuration 602 includes gathered authorization attributes, authentication login module 616 is bypassed and map Web inbound login module 618 is invoked to map authorization and authentication data from the user identity to a principal and credential of a Subject.

According to the JAAS framework, a Subject represents the source of a request. In these examples, a Subject may be an entity, such as a person or service. Once the Subject is authenticated, the Subject is populated with associated identities or principals. A Subject may have many principals. In addition, a Subject also has security attributes, referred to as credentials, which may be private or public. Different permissions are required to modify different credentials in these examples.

Using the user identity passed in from TAI, Subject 620 is created by map Web inbound login module 618 to map all gathered authorization attributes into corresponding principals and credentials 622. The map Web inbound login module 618 is a default login module provided by the present invention. A custom login module, such as custom login module 614, may be implemented by a service provider to specify already gathered authorization attributes included in a Java hash table into the shared state of the login context. By specifying well-known attribute names in the Java hash table, other login modules configured in the same login configuration do not need to duplicate the same remote user registry calls and may re-use the well-known attributes specified in the hash table. The shared state of the login context is accessible by the login modules at run time.

In addition to credentials and principals, the present invention allows a service provider to add custom objects 624 and other security information in a form of a token into Subject 620. The present invention provides a set of token interfaces that define behaviors of security runtime objects. The set of token interfaces is herein referred to as marker tokens. There are four types of marker tokens: authorization token 626, authentication token 628, single sign-on token 630 and propagation token 632. Each marker token extends from a generic token interface that defines default methods implemented by each token. A service provider may use these default marker tokens or create its own version of the marker tokens to make access control decisions for an incoming request.

In the present invention, authentication token 628, authorization token 626 and single sign-on token 630 are Subject-based. They are stored within a Subject, such as Subject 620, at run time. Propagation token 632 is invocation-based or thread-based. In other words, propagation token 632 is stored in a security context or thread local associated with the thread of execution at run time and is not specific to a Subject. Propagation token 632 is sent along with the request downstream and is set on the target server's thread of execution.

Authorization token 626 represents the identity of a user or service requester and flows downstream. Authentication token 628 represents attributes used to make authorization decision for a user or service requester and is propagated at the authorization token layer downstream. Multiple authentication and authorization tokens may be present in Subject 620 to store authentication and authorization attributes for different mechanisms.

Single sign-on token 630 is used by a service provider to set the token in the Subject such that a cookie is returned via a HTTP response to the client browser. Single sign-on token 630 has tighter security requirements because it may flow as a cookie in the external Internet space. Single sign-on token 630 would also likely be associated with a strong encryption mechanism and has different attribute information than authentication token 628 or authorization token 626. Based on the implementation, single sign-on token 630 may also be propagated to servers downstream such that downstream server may use single sign-on token 630 if the servers downstream are used to serve other Web-based application.

In addition, the present invention provides a getUniqueID method to define uniqueness of a Subject above and beyond the user id that is currently available. When getUniqueID method is called at run time, a service provider may return null if no uniqueness is desired for a Subject or return a string to represent uniqueness of the Subject. The unique id is used for caching purposes such that a service provider may identify a particular Subject at run time. The subject unique id is generated by aggregating the unique ids from each token included in that subject. In addition, the unique id may be carried in a single sign-on token for other servers to lookup a particular Subject, in order to ensure that the correct Subject is obtained.

Once authentication login is complete using mapped credentials/principals and marker tokens are added to Subject 620, the caller list of propagation token 632 is updated with a new user, such as user 1, and the host list of propagation token 632 is updated with a new host, such as host 1. The caller list of propagation token 632 tracks each user switch along an invocation chain and the host list of propagation token 632 tracks each server or resource the propagation token lands on during invocation.

Once the propagation token is updated, the present invention provides outbound login configuration 604, which determines target server or resource capabilities and security domain prior to propagating tokens downstream. If security attribute propagation is enabled at the target server or resource, both authentication token 640 and a new authorization token 642 will be sent downstream. Otherwise, only authentication token 640 is sent downstream. New authorization token 642 includes a hash table comprising credential attributes, an authorization token comprising credential attributes, a propagation token comprising thread-based attributes and other custom objects to be propagated downstream.

In this example implementation, outbound login configuration 604 includes custom mapping login module 634 and map outbound login module 635. Custom mapping login module 634 may be implemented as a mapping module. Based on information passed into custom mapping login module 634 including a target server realm and a effective policy, which indicates which layers of security will be performed and what security within the layer will be performed, an effective perform policy is generated. If the target server realm is supported and the perform policy allows propagation to the target server, custom mapping login module 634 maps the current authorization token and authorization attributes to a new identity that the target server understands.

Once the mapping is complete, outbound login configuration 604 invokes map outbound login module 635 to serialize contents of Subject into opaque authorization token 636. The present invention provides a Java™ helper class, such as WSOpaqueTokenHelper class, that provides protocol agnostic methods allowing any protocol to create an opaque authorization token from contents of a Subject and to convert an opaque authorization token back to contents of a Subject at the target server. The helper class first converts contents of a Subject, which may include authorization tokens, hash tables and custom objects, as well as the propagation tokens stored on the thread, to an array list of token holders. A token holder includes a name, a version and a byte array. A service provider downstream may query a specific token or object based on the name and the version of the token holder. Once the array list of token holder is created, the helper class serializes the array into opaque authorization token 636.

Thus, the helper class of the present invention enables a service provider to serialize a list of token objects into a byte array and propagate them downstream. In addition, the present invention enables custom serialization of objects by attaching a name and a version to a token holder, such that a service provider may implement a custom login module at a server downstream to look for the specific object.

After opaque authorization token 636 is created, outbound login configuration 604 sends the request, which includes opaque authorization token 636 and authentication token 638, downstream using a communication protocol, such as remote method invocation (RMI), to the target server, in this example, server 640. At server 640, inbound login configuration 606 allows normal login to occur if information passed into inbound login configuration 606 is a user id (identity assertion), a userid/password or a lightweight third party authentication (LTPA) token. An LTPA token is a token typically created when login occurs, which includes user id and password from the user registry. The LTPA token is validated by a target server using an LTPA key, which allows the target server to decrypt a signed LTPA token. LTPA login module 642 is then invoked by inbound login configuration 606 to perform normal login.

However, if the information passed into inbound login configuration 606 includes an opaque authorization token, such as opaque authorization token 636, inbound login configuration 606 invokes map inbound login module 644 to convert the opaque authorization token 636 back to contents of a Subject. Map inbound login module 644 first validates authentication token 638. Then, map inbound login module 644 deserializes the opaque authorization token 636 into an array list of token holder objects and cycles the array list to obtain desired token holder based on the name and version of each token holder.

Once a desired token holder is located, map inbound login module 644 further converts the byte array from the token holder into a credential within a Subject. Thus, the present invention allows a service provider to implement a default or custom login module to look for a specific token or object from an array list of token holders deserialized from an opaque authorization token. This feature is achieved by examining the name and version of each token holder.

Once the Subject is recreated at server 640, map inbound login module 644 updates the host list of the deserialized propagation token by appending the host list with host 2 identifying server 640. The host list is updated since propagation token 632 lands on server 640. Similarly, outbound login configuration 608 may be implemented at server 640 in order to propagate the request further downstream.

Thus, using the set of token interfaces defined in the present invention, service providers may implement different tokens based on their different roles or behaviors in the system. Each token may be associated with different token factories and have different token formats and encryption requirements. For example, the format of a single sign-on token may be different from an authorization token and may require encryption.

In addition, having a token interface defined by the present invention, logins may be differentiated using the getUniqueID method, which allows implementation of each token to be unique. For example, if user 1 logs into server 1 at 4 pm, different access right may be implemented by giving a token a different unique id than a token that allows user 1 to login into server 1 at 5 pm. The getUniqueID method allows different value to be returned for a Subject look up. An aggregation of all unique token ids may also be placed into a single sign-on token to be used for Subject lookup.

Figure 7A:
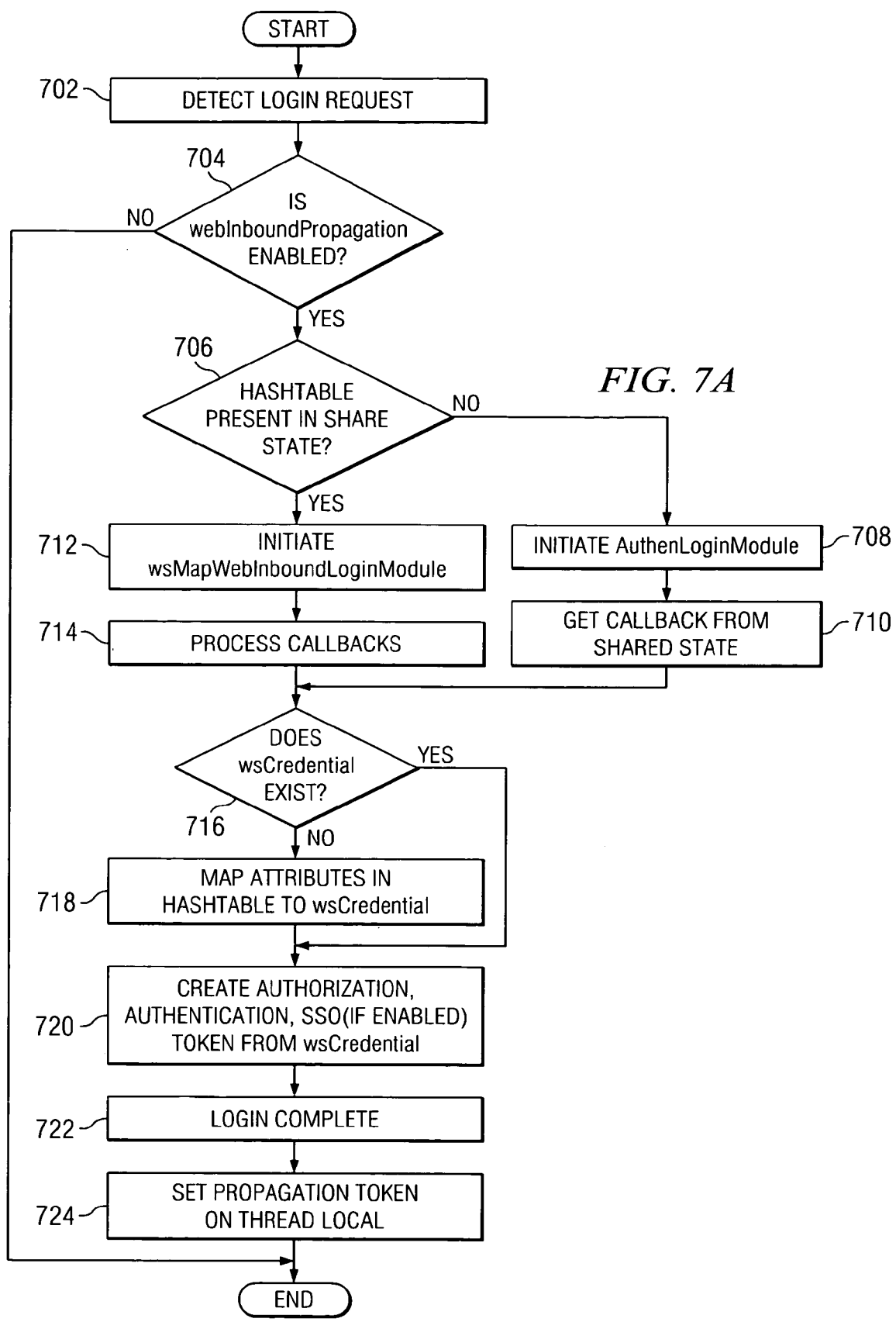
FIG. 7A is an exemplary flowchart illustrating operation from a source server's perspective when Web inbound login configuration is loaded in accordance with a preferred embodiment of the present invention.

With reference to FIG. 7A, an exemplary flowchart illustrating operation from a source server's perspective when Web inbound login configuration is loaded is depicted in accordance with a preferred embodiment of the present invention. As depicted in FIG. 7A, operation begins when a login request is detected at a first server (block 702). A determination is then made by Web inbound login configuration as to whether Web inbound propagation is enabled (block 704). The determination is made based on a configuration attribute that; is set in the top level properties of a security.xml file or system properties, for example.

If Web inbound propagation is disabled, operation terminates. If Web inbound propagation is enabled in block 704, Web inbound login configuration determines whether a hash table is present in shared state of the login context (block 706). The hash table is used to specify security attributes without using a user registry. Therefore, if a hash table exists, a registry call is not necessary.

If a hash table does not exist in shared state, Web inbound login configuration invokes authentication login module (block 708), which gets callbacks from shared state (block 710). If a hash table exists in shared state in block 706, Web inbound login configuration bypasses initial login and invokes map Web inbound login module (block 712). Map Web inbound login module processes callbacks (block 714), which include name callback, password callback, credential token callback and token holder callback. Credential token callback returns a LTPA token and token holder callback returns an array list of token holder objects.

Once callbacks are processed or gathered, a determination is made as to whether a credential of the Subject exists (block 716). A credential is created based on typical login information, such as a single sign-on token or userid/password callbacks. If a credential does not exist, map Web inbound login module maps attributes from the hash table (block 718). If a credential already exists, map Web inbound login module creates and initializes an authorization token, an authentication token, and a single sign-on token, if single sign on is enabled, using attributes from the credential (block 720).

Once the marker tokens are created, login is complete (block 722) and the propagation token is set by map Web inbound login module to the thread of execution or thread local (block 724). Thus, the operation terminates thereafter.

Figure 7B:
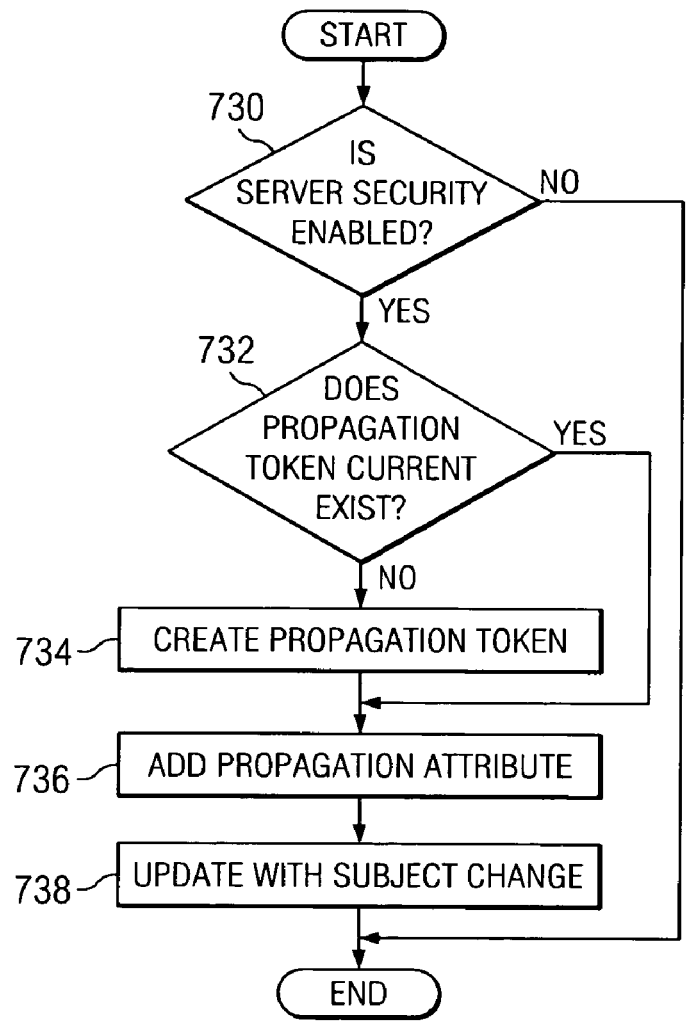
FIG. 7B is an exemplary flowchart illustrating operation of setting propagation token on thread local in accordance with a preferred embodiment of the present invention.

With reference to FIG. 7B, an exemplary flowchart illustrating operation of setting propagation token on thread local is depicted in accordance with a preferred embodiment of the present invention. This flowchart operation depicts block 724 in FIG. 7A in further detail.

As depicted in FIG. 7B, the operation begins with a determination as to whether server security is enabled at the current server (block 730). The server security determines the state of security enablement for an application server process. If server security is disabled, operation terminates. If server security is enabled in block 730, a determination is then made as to whether propagation token currently exists in the credential (block 732). The determination is made by examining the security context stored in thread local. If a propagation token does not exist, a new propagation token is created and placed in the security context of thread local (block 734).

Once a propagation token is created or if a propagation token already exists, attributes may be added by a service provider to the propagation token (block 736). Added Attributes may include authentication strength, authentication location, and time of day. Finally, the caller list of the propagation token is updated if a user switch occurs and the host list is updated with a host identifying the current server or resource (block 738). The caller list may be appended, for example, in the form of cell:node:server:caller. The host list may be appended, for example, in the form of cell:node: server. Thus, operation terminates thereafter.

Figure 8:
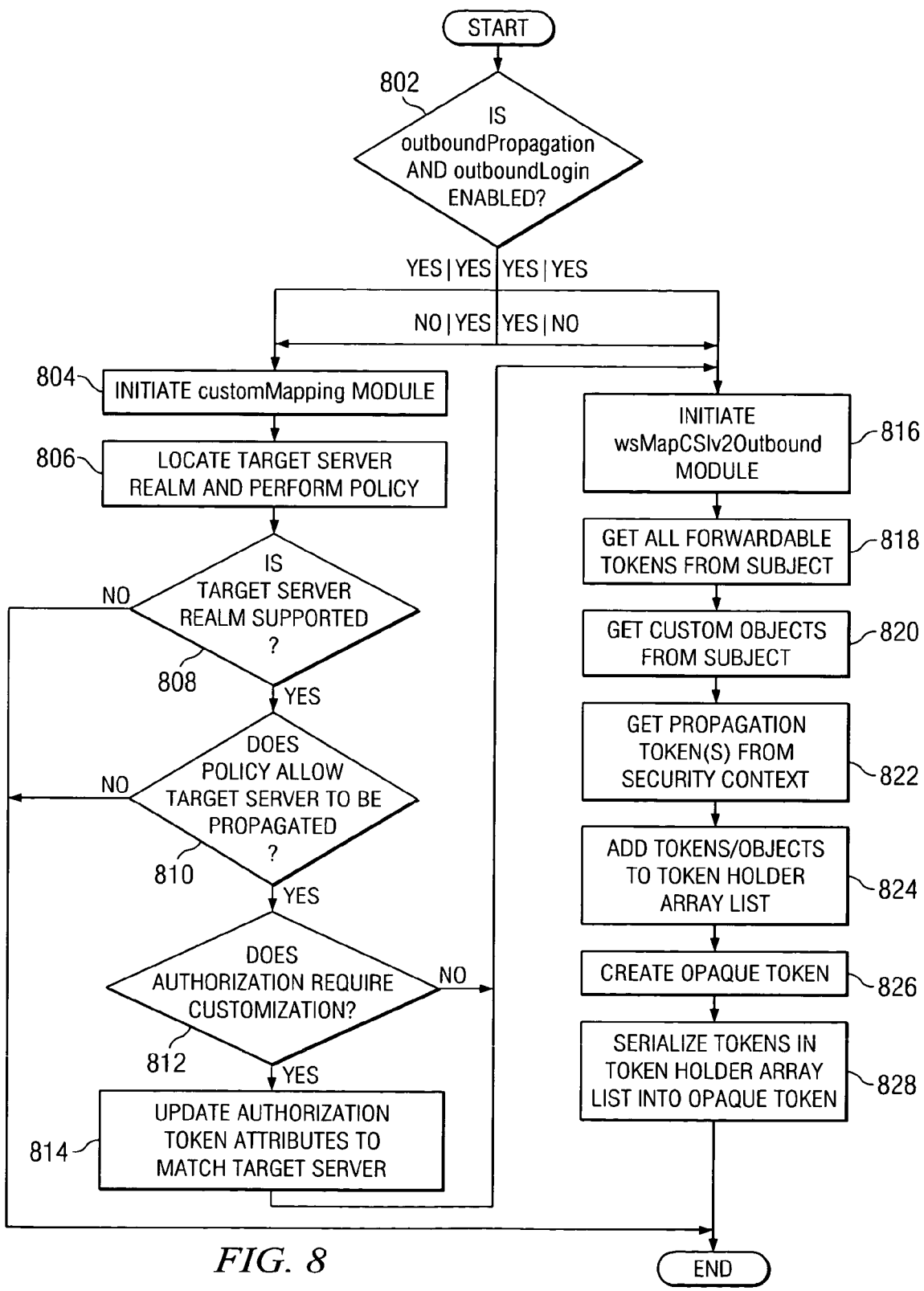
FIG. 8 is an exemplary flowchart illustrating operation from a source server's perspective when outbound login configuration is loaded in accordance with a preferred embodiment of the present invention.

Turning next to FIG. 8, an exemplary flowchart illustrating operation from a source server's perspective when outbound login configuration is loaded is depicted in accordance with a preferred embodiment of the present invention. As illustrated in FIG. 8, the operation begins with a determination of whether outbound propagation and outbound login are enabled based on the configuration attributes set in the security.xml file or system properties (block 802). If one or more configuration attributes are enabled, outbound login configuration may either invoke custom mapping module (block 804) to map tokens/users based on the target server realm or invoke map outbound module (block 816) to create opaque authorization token in order to serialize tokens to be propagated downstream. These two login modules are explained in further details below.

Turning back to block 802, if outbound propagation is not enabled, but outbound login is enabled, only the custom mapping module is invoked by outbound login configuration (block 804). If outbound propagation is enabled, but outbound login is disabled, map outbound login module is invoked (block 816).

When custom mapping module is invoked at block 804, it performs credential mapping by first locating target server realm and effective policy (block 806). The target server realm and effective policy is passed into the login configuration, by which a perform policy is generated. Next, a determination is made by custom mapping module as to whether the target server realm is supported (block 808). The determination is made by examining the target server realm passed in and identifying whether the current server realm matches the target server realm or that the target server realm is in a delimited list of supported/trusted realms. If the target server realm is not supported, the operation terminates.

Alternatively, if the target server realm is supported, a determination is then made by the custom mapping module as to whether perform policy allows the target server to be propagated (block 810). If the perform policy does not allow the target server to be propagated, operation terminates. If the perform policy allows target server to be propagated in block 810, a determination is made as to whether current authentication token or authorization attributes requires customization (block 812). If customization is not required, the operation continues to block 816 to invoke map outbound login module. Otherwise, if customization is required, the custom mapping module maps the current authentication token or authorization attributes to a new identity that the target server will understand using service configuration name of the target server and the operation continues to block 816 to invoke map outbound login module.

Once map outbound login module is invoked by outbound login configuration at block 816, map outbound login module queries the Subject to get all forwardable tokens (block 818). The query is performed by searching credential of the Subject for any objects that implement the default token interface. Next, map outbound login module queries the Subject to get custom objects that are serializable (block 820). An exclude list is checked to ensure custom objects are not propagated if present on this list. This list may be a colon delimited list of class or package names. If a custom object equals the class name or starts with the package name, then it is not propagated.

Map outbound login module then queries the Subject for propagation tokens from the security context of the thread local that are forwardable (block 822). After tokens are located in blocks 818-822, a getBytes method is invoked on the token to return a byte array. This byte array is then added to the array list of token holders (block 824).

Once an array list of token block is created, an opaque authorization token is created (block 826) by instantiating an opaque token object, which may be a byte array. Finally, the opaque token byte array is populated by cycling the array list of token holders and serializing each token holder in the list into the byte array (block 826). Thus, operation terminates thereafter.

Figure 9:
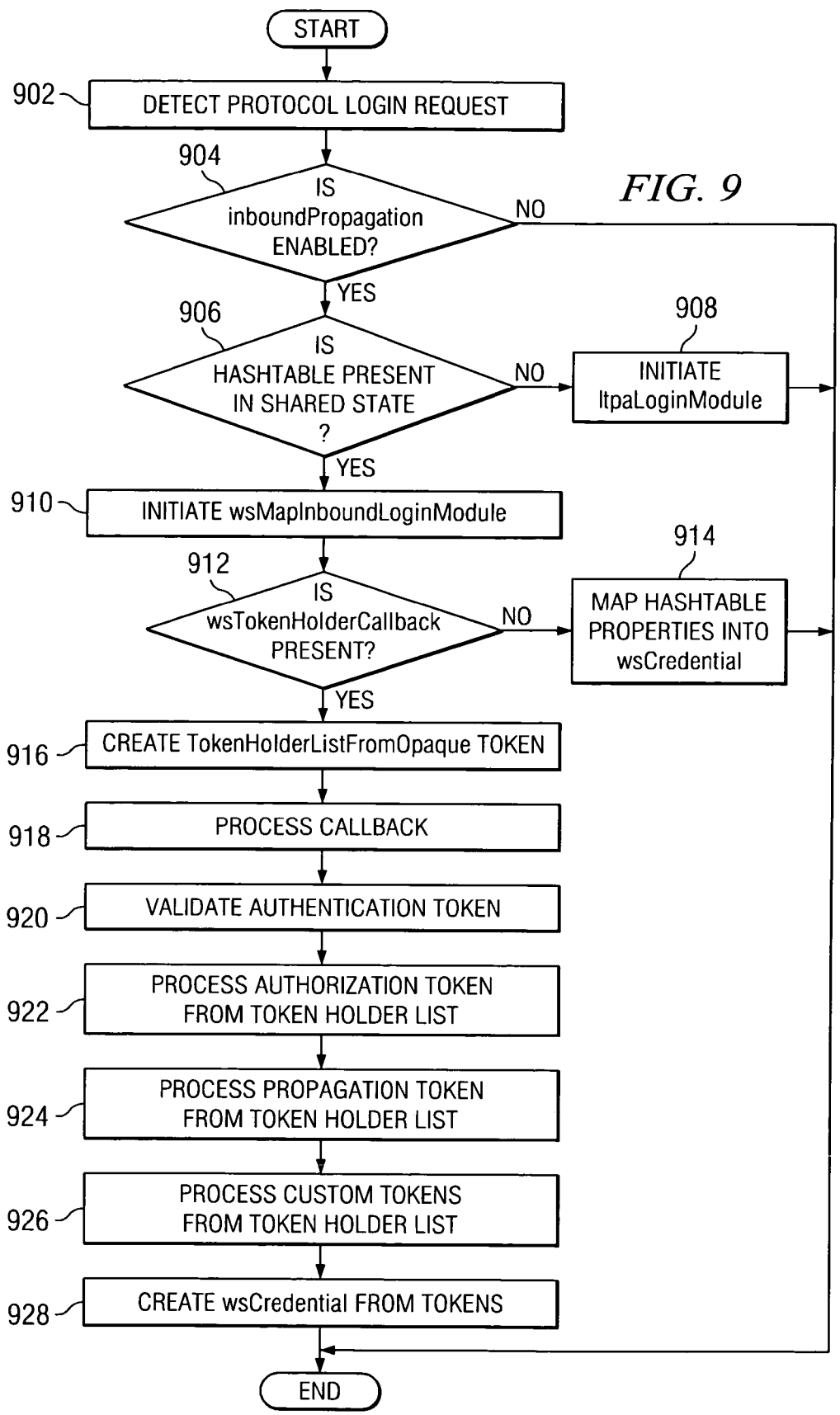
FIG. 9 is an exemplary flowchart illustrating operation from a target server's perspective when inbound login configuration is loaded in accordance with a preferred embodiment of the present invention.

Turning next to FIG. 9, an exemplary flowchart illustrating operation from a target server's perspective when inbound login configuration is loaded is depicted in accordance with a preferred embodiment of the present invention. As depicted in FIG. 9, the operation begins when a protocol login request is detected at target server, in this example, server 2 (block 902). A determination is then made by inbound login configuration as to whether inbound propagation is enabled (block 904). The determination is made based on the configuration attribute set in the security.xml file or system properties, for example. If inbound propagation is not enabled, the operation terminates. If inbound propagation is enabled, a determination is then made as to whether a hash table is present in the shared state of the login context (block 906).

If a hash table is not present, inbound login configuration invokes LTPA login module (block 908). The LTPA login module carries out primary login using normal authentication information, such as userid and password, LTPA token, or a TAI user name. However, if a hash table is present, the LTPA login module is bypassed and inbound login configuration then invokes map inbound login module (block 910) to perform primary login. Once the map inbound login module is invoked, a determination is made as to whether token holder callback is present (block 912). If the token holder callback is not present, map inbound login module maps well-defined attributes from the hash table into credential of the Subject (block 914) and the operation terminating thereafter.

However, if the token holder callback is present in block 912, map inbound login module creates an array list of token holders by deserializing the opaque authorization token received from the protocol (block 916). The login module first processes callbacks passed into a JAAS login via a token holder callback object (block 918).

Next, map inbound login module validates the authentication token passed in outside of the opaque authentication token (block 920). The map inbound login module then processes each authorization token in the array list of token holders deserialized from the opaque authorization token (block 922). The login module processes the authorization token by mapping the attributes in the token into credential of the Subject. If there is any custom authorization token implementation made by the service provider upstream, a custom login module should be plugged in just prior to or right after this block to handle the custom authorization token.

Once the authorization token is processed, map inbound login module then processes each propagation token in the array list of token holders (block 924). The login module processes the propagation token by setting it on the thread of execution of the current resource. If there is any custom propagation token implementation made by service provider upstream, a custom login module should be plugged in just prior to or right after this block to handle the custom propagation token.

Once the propagation token is processed, map inbound login module processes all custom tokens or objects that are serialized using normal Java™ serialization (block 926). This allows service provider upstream to implement custom object serialization and provide handler downstream to handle the object. Finally, map inbound login module creates a credential and principal needed at runtime from information in the processed authorization token and authentication token (block 928) with the operation terminating thereafter.

Figure 10:
FIG. 10 is a diagram illustrating serialization and deserialization using exemplary mechanisms of the present invention in accordance with a preferred embodiment of the present invention.

Turning now to FIG. 10, a diagram illustrating serialization and deserialization using exemplary mechanisms of the present invention is depicted in accordance with a preferred embodiment of the present invention. As illustrated in FIG. 10, when an outbound request is detected by outbound login configuration 1002, credential 1010 in the Subject at run time is queried by map outbound login module, which is invoked by outbound login configuration 1002. The map outbound login module uses methods in credential token mapper 1004 to create different marker tokens, custom objects 1018 and hash table 1016 for propagation downstream. Credential token mapper 1004 provides methods that create authentication token and authorization token 1012 using attributes of the credential 1010, such as groups, access id, and long security name.

In addition, credential token mapper 1004 provides methods to create propagation token 1014 from the security context of the thread of execution, since propagation token 1014 is associated with a thread of execution, not credential 1010. Once the tokens are created, the map outbound login module uses methods provided by security propagation helper 1020 to get all forwardable tokens from credential 1010 and forwardable propagation token and add each token into an array list of token holders 1022. Next, the map outbound login module invokes the opaque token helper 1024 methods to create an opaque authorization token 1026 that is used to send tokens downstream. Then, opaque authorization token 1026 is serialized by map outbound login module into byte array 1027 and is propagated downstream using protocol 1028.

When byte array 1027 is received at a server or resource downstream, inbound login configuration 1030 detects the incoming request and invokes map inbound login module to call methods of opaque token helper 1032, in order to deserialize byte array 1027 into a opaque authorization token 1034. Opaque token helper 1032 provides methods that deserializes opaque authorization token 1034 into array list of token holders 1036. The array list includes authorization token 1038, propagation token 1040, hash table 1042 and custom objects 1044 that are propagated downstream.

Next, each token in array list of token holders 1036 is processed by map inbound login module to determine which of the token holders is desired based on the name and the version of the token holders. If the custom propagation token or authorization token is implemented upstream, custom login module may be implemented to identify the custom token. Once desired tokens are identified, the map inbound login module invokes methods in credential token mapper 1046 and maps authorization and authentication token obtained from the token holder to credential 1048.

Figure 11:
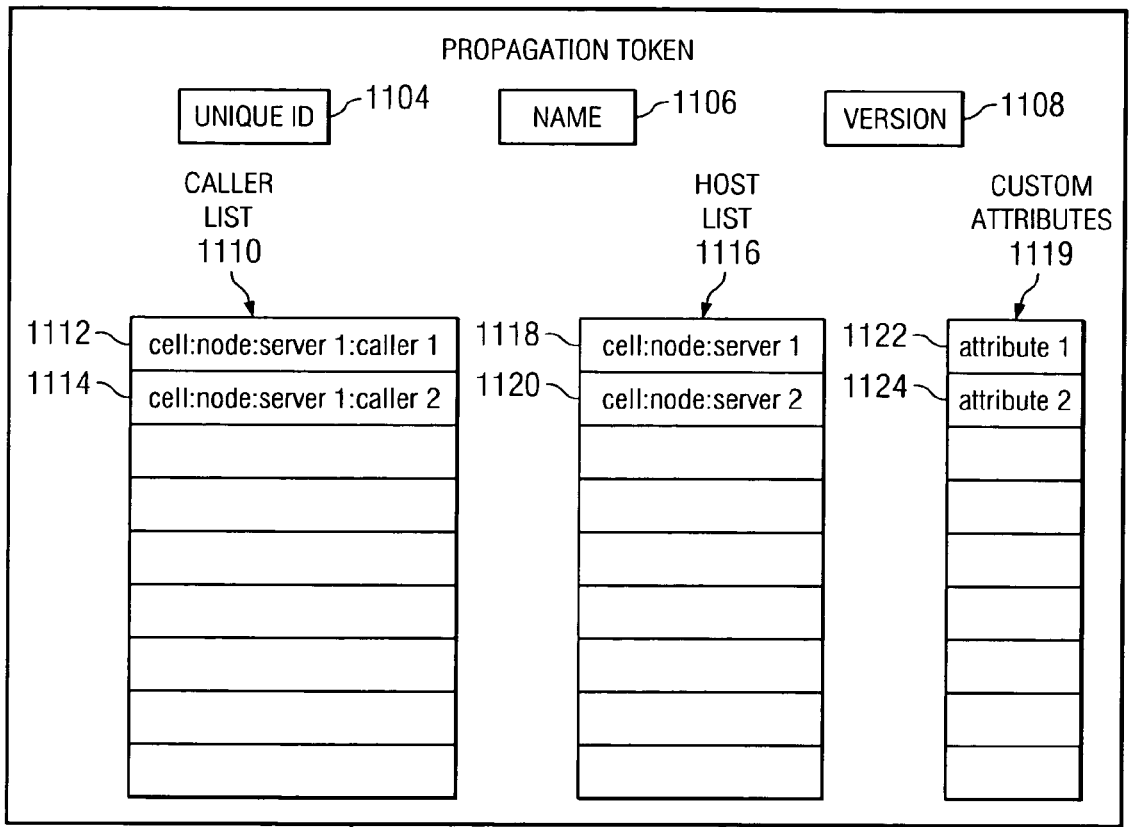
FIG. 11 is a diagram illustrating an exemplary propagation token implementation in accordance with a preferred embodiment of the present invention.

Turning now to FIG. 11, a diagram illustrating an exemplary propagation token implementation is depicted in accordance with a preferred embodiment of the present invention. As depicted in FIG. 11, in this example implementation, propagation token 1102 includes unique id 1104, name 1106 and version 1108.

These fields are defined by the default token interface of the present invention. Propagation token 1102 also include caller list 1110, host list 1116 and custom attributes 1118. Caller list 1110 includes two entries: entry 1112 and entry 1114. Entries 1112 and 1114 are in the form of cell:node:server:caller. When a user switch occurs, meaning when a user within a Subject is changed, the caller list is appended with a new caller. In this example, caller 2 in entry 1114 is appended to the originating caller, which is caller 1, in entry 1 1112, of caller list 1110.

FIG. 11 also shows host list 1116, which includes two entries: entry 1118 and entry 1120. Entries 1118 and 1120 are in the form of cell:node:server. Entry 1118 has a value of 'cell:node:server1' and entry 1120 has a value of 'cell:node:server2'. When propagation token 1102 lands on a server or resource downstream, host list 1116 is appended with a new host. In this example, propagation token 1102 first lands on server 1 and then on server 2. Therefore, entry 1120 is appended to entry 1118 in host list 1116.

At any given server or resource, a service provider may add custom attributes 1119 to be propagated downstream. Custom attributes may include authentication strength or authentication location. In this example, attribute 1 1122 is added by caller 1 and attribute 2 1124 is added by caller 2.

Figure 12:
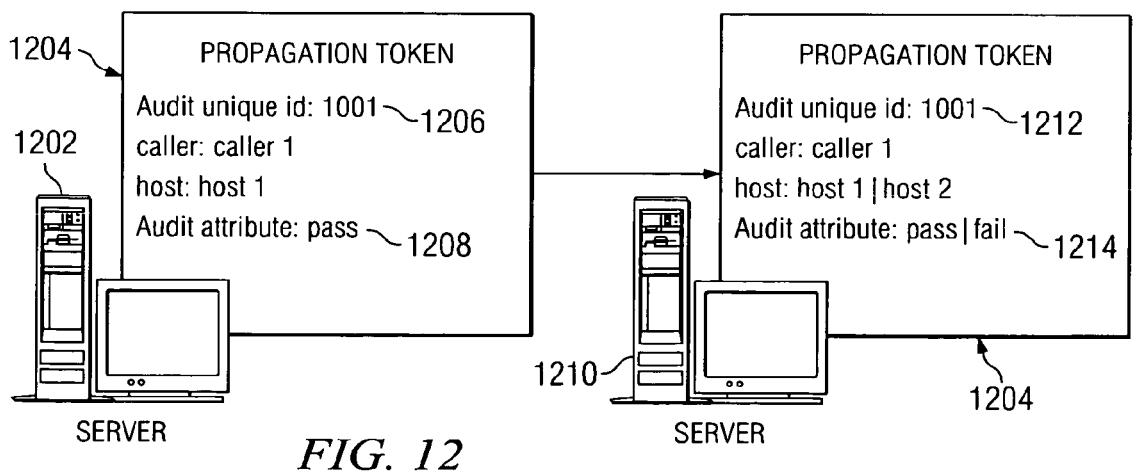
FIG. 12 is a diagram illustrating an exemplary implementation of propagation token for auditing purpose in accordance with a preferred embodiment of the present invention.

Turning now to FIG. 12, a diagram illustrating an exemplary implementation of propagation token for auditing purpose is depicted in accordance with a preferred embodiment of the present invention. As depicted in FIG. 12, in this example implementation, propagation token 1204 is implemented in server 1202. Propagation token 1204 includes audit unique id 1206, which identifies a particular audit transaction. In this example, audit unique id 1206 has a value of '1001'. Using custom attributes in propagation token 1204, such as custom attributes 1119 in FIG. 11, audit attributes may be associated with audit unique id 1206. In this example, audit attribute 1208 has a value of 'pass' and is associated with audit unique id 1206.

When propagation token 1204 is propagated downstream to server 1210, service provider at server 1210 may use getUniqueID method to identify a propagation token that has an audit unique id of '1001'. Once the audit transaction is identified, in this example, audit unique id 1212, the service provider may add its own audit attribute to propagation token 1204. In this example, a value of 'fail' is appended to audit attribute 1214 after the value of 'pass'.

Thus, using the propagation token of the present invention, an audit function may be performed by associating audit attributes at each hop with an audit unique id, which identifies a particular audit transaction.

Turning next to FIG. 13A, a diagram illustrating an exemplary implementation of propagation token with same propagation attributes implemented using an established session between two servers is depicted in accordance with a preferred embodiment of the present invention. As depicted in FIG. 13A, in this example implementation, propagation token 1302 is implemented on server 1304. Propagation token 1302 includes unique id 1306 having a value of '1001' and change flag 1310 having a value of 'false'. Change flag 1310 identifies whether attributes, such as custom attributes 1308, in propagation token 1302 are changed. If custom attributes 1308 are changed in propagation token 1302, change flag 1310 is set to 'true'.

In this example, propagation token 1302 is propagated to server 1314 via established secure session 1304. However, since custom attributes 1308 remain the same, from server 1304 to server 1314, each having a value of 'attribute 1', session 1304 remains secured and active. In addition, no re-authentication is required at server 1314.

Turning next to FIG. 13B, a diagram illustrating an exemplary implementation of propagation token with different propagation attributes implemented using a new session between two servers is depicted in accordance with a preferred embodiment of the present invention. As depicted in FIG. 13B, in this example implementation, propagation token 1320 is similar to propagation token 1302 in FIG. 13A, which is also implemented on server 1322. However, custom attributes 1324 have been changed. A value of 'attribute 2' is appended to the value of 'attribute 1'. Consequently, the value of change flag 1328 is updated to 'true' and unique id 1326 now has a value of '1002'.

A new session, session 1334, is created by server 1322, which causes all authentication tokens, authorization tokens and propagation tokens, such as propagation token 1320, to flow downstream to server 1330. In this case, a re-authentication is required at server 1330.

Thus, using the propagation token of the present invention, session uniqueness is defined using a unique id field and a change flag, which identifies that a change of propagation data has occurred and that a new session and authentication is required downstream.

In summary, the present invention provides a set of token interfaces that allow original login information to be propagated downstream by enabling service providers to plug in customized login modules at each JAAS plug point. The token interfaces of the present invention also enable service providers to define uniqueness of each token propagated by providing a getUniqueID method, which enhances control of runtime behavior. In addition, performance throughput of the system is improved due to the elimination of duplicate registry calls to the user registry, which acts as a bottleneck, when gathering original login information.

Furthermore, custom object serialization is provided by the present invention which allows service providers to define custom objects that are to be propagated along the invocation chain and to specify login modules at the target server or resource to handle the custom objects. This feature has an advantage over existing Java serialization, in that error is less likely to occur downstream and that custom object serialization is not affected by a version change in Java.

Moreover, the propagation token of the present invention identifies the originating caller, subsequent callers when context switches occur, and a list of hosts where the propagation token lands on, to be propagated along the invocation chain for use by other servers. The propagation token also provides an auditing purpose by allowing audit attributes to be associated with an audit unique id, which provides linkage of audit records.

In addition, by tracking the first caller in the invocation chain, the propagation token may be used for billing purpose, which allows systems to charge the originating caller for resource utilized. Furthermore, session uniqueness is provided by using the getUniqueID method of the propagation token to force a re-authentication login after a new session is created. Moreover, the service provider may use the propagation token to implement a policy at each hop of the invocation chain to determine who may access the propagation token or to implement a desired sequence of hosts.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for tracking security attributes along an invocation chain, the computer implemented method comprising:
   responsive to detecting an authentication request at a first resource, authenticating a source of the request at the first resource;
   creating a propagation token for the request in response to authenticating the source, wherein the propagation token includes a caller list, a host list and custom attributes; and
   associating the propagation token with an executing thread at the first resource.

2. The method of claim 1, further comprising:
   initializing the propagation token;
   serializing the propagation token; and
   propagating the propagation token to a second resource.

3. The method of claim 2, further comprising:
   detecting an opaque token at the second resource;
   determining if the opaque token is acceptable at the second resource; and
   if the opaque token is acceptable, determining if the opaque token is a custom token.

4. The method of claim 3, further comprising:
if the opaque token is a custom token, invoking a custom login module at the second resource to deserialize the custom token; and
if the opaque token is not a custom token, invoking a default login module at the second resource to deserialize the opaque token.

5. The method of claim 4, wherein invoking a custom login module at the second resource to deserialize the custom token comprises:
examining a name and a version of the custom token;
determining if the name and the version is defined by a service provider at the second resource;
if the name and the version is defined, deserializing a byte array of the custom token;
converting the byte array to a custom object defined by the service provider.

6. The method of claim 4, wherein invoking a default login module at the second resource to deserialize the token comprises:
deserializing a byte array of the opaque token;
converting contents of the byte array into a default propagation token object.

7. The method of claim 3, wherein the first resource is a resource executing in a first data processing system and the second resource is a resource executing in a second data processing system.

8. The method of claim 3, wherein the first resource and the second resource are resources executing in a same data processing system.

9. The method of claim 3, wherein determining if the token is acceptable at the second resource comprises:
deserializing the opaque token into an array list of token holders;
obtaining the propagation token from the array list of token holders;
examining a host list of the propagation token to determine if the host list follows a desired sequence of hosts, wherein the desired sequence of hosts is defined by a service provider at the second resource.

10. The method of claim 3, wherein determining if the opaque token is a custom token comprises:
examining a unique id of the propagation token to determine if the unique id is defined by a service provider at the second resource.

11. The method of claim 10, further comprising:
if the unique id is not defined by the service provider and a secure session is established between the first and second resource, creating a new session between the first and second resource; and
performing a re-authenticating at the second resource.

12. The method of claim 2, wherein initializing the propagation token comprises:
appending a host identifying the first resource to the host list of the propagation token;
monitoring the executing thread at the first resource to determine if a user switch occurs;
appending a user to the caller list of the propagation token if the user switch occurs; and
appending a custom attribute to the custom attributes of the propagation token if a service provider at the first resource desires.

13. The method of claim 2, wherein serializing the propagation token comprises:
converting the propagation token to a byte array of a token holder, wherein the token holder includes a name, a version and a byte array;
setting the name and the version of the token holder;
adding the token holder to an array list of token holders;
creating an opaque token object; and
serializing the array list of token holders into the opaque token object.

14. The method of claim 13, wherein propagating the propagation token to a second resource comprises:
determining if the second resource is supported and allowed to be propagated;
sending the opaque token object using a communication protocol to the second resource if the second resource is supported and allowed to be propagated.

15. The method of claim 2, wherein serializing the propagation token is performed by a custom login module at the first resource if the propagation token is a custom token.

16. The method of claim 1, wherein the caller list includes an originating caller and subsequent caller along the invocation chain, and wherein the host list includes a list of hosts the propagation token lands on along the invocation chain.

17. The method of claim 16, wherein usage of the second resource is charged to an originating caller of the caller list.

18. The method of claim 16, wherein methods are invoked by a service provider at the second resource based on an originating caller of the caller list.

19. The method of claim 16, wherein a unique id of the propagation token is an audit unique id and the custom attributes are audit records associated with the audit unique id.

20. The method of claim 1, wherein authenticating a source of the request comprises:
invoking a method to obtain original login information from the source of the request;
determining if the original login information includes authorization and authentication data; and
if the original login information includes authorization and authentication data, invoking a default login module to map authorization and authentication data to a credential of a subject.

21. The method of claim 20, further comprising:
if the original login information includes only authentication data, invoking a normal login module to perform authentication.

22. The method of claim 1, wherein creating a propagation token for the request comprises:
instantiating a new propagation token object; and
extending the new propagation token object from a default propagation marker token interface, wherein the default propagation marker token interface implements a default token interface.

* * * * *